United States Patent [19]

Ash et al.

[11] Patent Number: 4,834,829
[45] Date of Patent: May 30, 1989

[54] VACUUM RING FOR PRODUCING LAMINATED GLASS

[75] Inventors: Charles E. Ash, Perrysburg, Ohio; Siegfried H. Herliczek, Petersburg, Mich.; David R. Jenkins, Maumee, Ohio

[73] Assignee: Libbey-Owens-Ford Co., Toledo, Ohio

[21] Appl. No.: 138,321

[22] Filed: Dec. 28, 1987

[51] Int. Cl.[4] .............................................. B32B 31/24
[52] U.S. Cl. ...................................... 156/382; 156/87; 156/104; 156/285; 156/286
[58] Field of Search ................. 156/87, 382, 285, 286, 156/287, 104, 106; 269/21; 279/3; 425/405 R, 388, 389, DIG. 19, DIG. 60

[56] References Cited

U.S. PATENT DOCUMENTS

| | | | |
|---|---|---|---|
| 1,870,284 | 8/1932 | Drake | 156/104 |
| 2,948,645 | 8/1960 | Keim | 156/104 |
| 2,992,953 | 7/1961 | Talburtt | 156/104 |
| 3,074,466 | 1/1963 | Little | 156/104 |
| 3,074,838 | 1/1963 | Little | 156/104 |
| 3,249,479 | 5/1966 | Boicey | 156/104 |
| 3,281,296 | 10/1966 | Jameson | 156/104 |
| 3,808,077 | 4/1974 | Rieser | 156/104 |
| 3,933,552 | 1/1976 | Shumaker | 156/104 |
| 3,971,668 | 7/1976 | Pickard | 156/382 |
| 4,242,403 | 12/1980 | Mattimoe | 428/213 |
| 4,624,731 | 11/1986 | Ash | 156/382 |
| 4,647,327 | 3/1987 | Rase | 156/87 |
| 4,781,783 | 11/1988 | Ash | 156/382 |

*Primary Examiner*—Merrell C. Cashion, Jr.
*Attorney, Agent, or Firm*—Marshall & Melhorn

[57] ABSTRACT

A vaccum ring is coupled to a vacuum source and utilized to de-air a laminated glass assembly while it is positioned within a pressurized and heated autoclave unit. The vacuum ring has a channel for receiving the edge of the glass assembly and is fabricated to minimize the extrusion of the laminating material during the autoclave operation. The walls of the channel each have a single longitudinally extending groove approximately centered between the edges of the wall, and the floor of the channel includes a single longitudinally extending groove positioned to be adjacent the edge of a laceration shield layer of the glass assembly. All three grooves interconnect with the vacuum source. The channel generally conforms to the outer edge of the glass assembly with or without applied vacuum of pressure, and the provision of grooved walls greatly enhances the sealing of the ring to the glass.

7 Claims, 1 Drawing Sheet

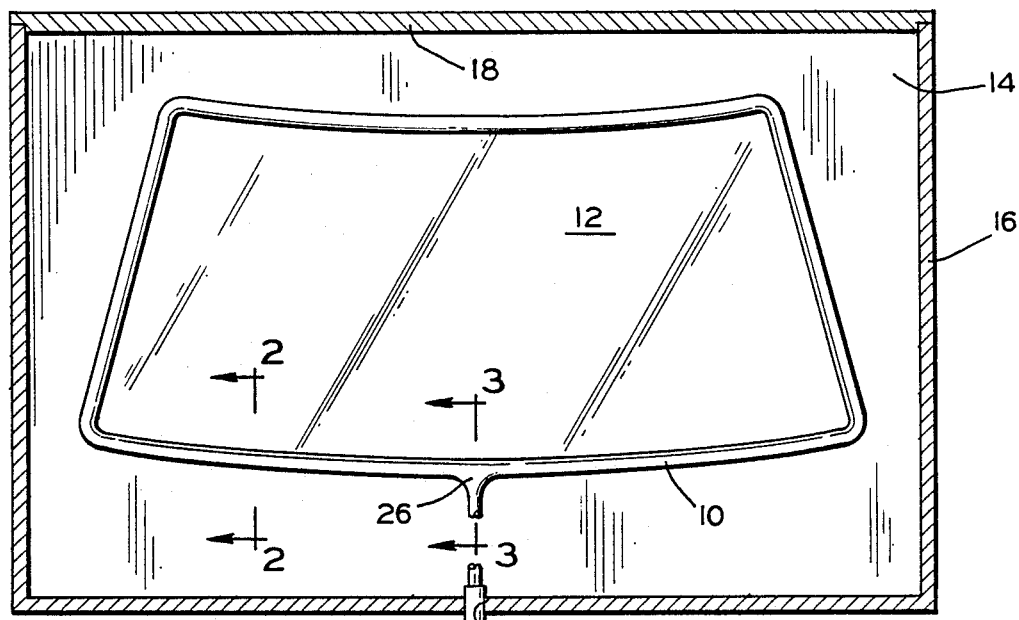
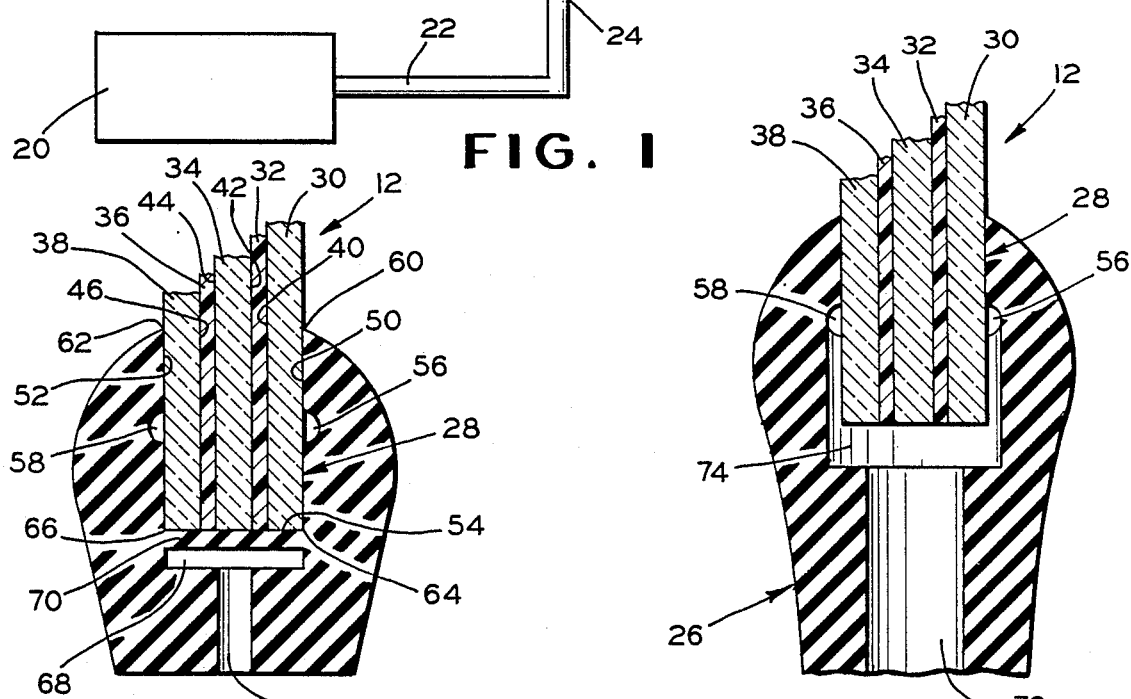
FIG. 1
FIG. 2
FIG. 3
FIG. 4

VACUUM RING FOR PRODUCING LAMINATED GLASS

BACKGROUND OF THE INVENTION

The present invention relates generally to a vacuum system for evacuating the space between at least two laminae of a laminated assembly and in particular to a vacuum ring construction which is utilized for de-airing a laminated glass assembly such as an automobile windshield, for example, which is an improvement over the ring construction disclosed in application Ser. No. 710,287 filed Mar. 11, 1985, entitled VACUUM RING FOR PRODUCING LAMINATED GLASS, now U.S. Pat. No. 4,624,731, issued Nov. 25, 1986.

In the early stages of the automobile industry, single sheets of ordinary glass were employed as windshields. As it became evident that this type of windshield presented a considerable safety hazard, the single sheets of ordinary glass were replaced with single sheets of heat treated or tempered glass. Thereafter, laminated safety glass was developed to further reduce the severity of lacerative injuries. The use of laminated glass assemblies greatly increased, until today, when almost all automotive windshields are constructed of some type of laminated glass.

Typically, a laminated glass assembly of the type utilized in vehicle windshields consists of two sheets of glass bonded together with a thin plastic interlayer, such as a sheet of polyvinyl butyral, or the like. In the event of an impact on the laminated glass sufficient to break it, the plastic interlayers function to bind the glass fragments together, thus reducing the risk of injury to a driver or passenger as a result of flying glass or contact with the windshield.

Recently, it has been found that the addition of a second plastic layer to the inner surface of the windshield further reduces the risk of injury. This second plastic layer has been called an anti-laceration shield. Also, it has been found that a single sheet of glass having an anti-lacerative plastic layer applied to its inner surface can serve as a safety windshield or other type of safety window.

A detailed discussion of laminated windshield assemblies and their production methods can be found in U.S. Pat. Nos. 3,808,077 and 4,242,403.

One of the problems of manufacturing laminated glass assemblies of this type is related to the assembling and bonding techniques used to produce a windshield having high optical qualities. The individual laminae of the laminated assembly are typically assembled in a stacked arrangement and are pressed toward one another within a heated autoclave. The entire assembly is heated within the pressurized interior of the autoclave to a predetermined temperature to cause the layers of plastic material to soften and bond to the adjacent glass sheets.

Prior to placing the stacked arrangement of individual laminae in an autoclave, it has been found desirable to evacuate air spaces which may be present between the individual laminae. One of the methods employed to achieve the above objective is to place the assembly in a plastic bag and evacuate the bag. A more current method is to use a vacuum ring of the type disclosed in U.S. Pat. Nos. 2,948,645 and 3,074,466 within a flexible vacuum ring which is provided with a channel for receiving the entire peripheral edge of the assembly. The channel of the vacuum ring includes a recessed portion which is maintained in a spaced-apart relationship with the entire peripheral edge of the glass assembly, to define a vacuum passage.

In some instances, it is desirable to maintain the vacuum ring in place when the assembly is within the autoclave, and to apply a vacuum to the ring during at least part of the time the assembly is heated and pressurized. However, one of the problems with such an approach is that the softened plastic layers are drawn outwardly, past the marginal edges of the glass sheets and into the recessed portion of the vacuum ring. This tends to reduce the thickness of the plastic layers around the marginal edges of the glass, and produces undesirable optical distortion in those areas.

The problem is further compounded when the glass sheets of the laminated assembly are of different sizes, or when there is improper alignment of glass sheets. The different sizes of the glass sheets or improper alignment in the laminated assembly creates a void between the laminated assembly and the floor of the vacuum ring when the ring is attached to the assembly. The void permits the unwanted outward flow of the softened plastic layers of the laminated assembly, past the marginal edges of the glass sheets, and into the void between the laminated assembly and the floor of the vacuum ring, thus reducing the thickness of the plastic layers in the region of the marginal edges of the glass resulting in an undesirable optical distortion in those areas.

SUMMARY OF THE INVENTION

The present invention relates to a unique vacuum ring construction substantially eliminating the distortion occurring about the peripheral edges of the laminated assembly during the heating and pressurizing operation in the autoclave particularly in situations in which the laminated assembly includes glass sheets of different sizes or improper alignment.

The vacuum ring of the present invention is adapted to be mounted about the peripheral edge of the laminated assembly and coupled to a source of vacuum. The ring is constructed of a flexible material such as rubber, for example. The ring is provided with a channel for receiving the peripheral edge of the laminated assembly.

In accordance with the present invention, the channel defines an inner surface having a cross-sectional configuration defined by the shape of the outer edge surface of the laminated assembly before the ring is mounted on the laminated assembly and coupled to the vacuum source. A inner surface is defined by first and second facing wall sections, and an interconnecting floor portion. Each facing wall section includes a longitudinally extending continuous single groove formed therein. The grooves are distal to both the outer edge of the wall and to the floor portion, and are formed in facing intermediate portions of the first and second walls. The two grooves are connected to a source of vacuum which provides for a continuous vacuum evacuation of the periphery of the laminated assembly. A cavity is formed under the floor portion and separated therefrom by a thin membrane. The cavity may be provided with a plurality of conduits through the bottom of the ring, exposing the cavity to the pressure created by an autoclave during the process of the manufacture of the laminated assembly. The addition of the pressure created by the autoclave onto the membrane causes the associated membrane to be forced into intimate contact with the edges of the glass sheets. The membrane is capable of conforming to the edges of glass sheets in spite of any misalignment of the sheets.

BRIEF DESCRIPTION OF THE DRAWINGS

The above, as well as other advantages of the present invention, will become readily apparent to one skilled in the art from reading the following detailed description of the invention in conjunction with the attached drawings, in which:

FIG. 1 is a schematic illustration of a laminated glass assembly surrounded by a vacuum ring embodying the features of the present invention;

FIG. 2 is an enlarged fragmentary view taken along line 2—2 in FIG. 1, showing the vacuum ring and the associated assembly;

FIG. 3 is an enlarged fragmentary sectional view taken along line 3—3 of FIG. 1, showing the vacuum tee portion; and FIG. 4 is an enlarged fragmentary view of the vacuum tee portion illustrated in FIGS. 1 and 3.

DESCRIPTION OF THE PREFERRED EMBODIMENT

It should be noted at the outset of this description that the vacuum ring of the present invention can be utilized in the manufacturing of all types of laminated assemblies, including single sheets of glass with an anti-laceration layer, and multiple layers of non-glass materials.

In FIG. 1, there is shown a vacuum ring 10 positioned around the peripheral edge of a laminated glass assembly 12. The individual laminae of the laminated assembly 12 are illustrated in greater detail in the cross-sectional views of FIGS. 2 and 3. The laminated glass assembly 12 and the vacuum ring 10 are disposed in an autoclave chamber 14, defined by side and bottom walls 16 and a removable top panel 18.

The vacuum ring 10, which can be constructed of a flexible material such as silicone rubber, for example, is connected to a vacuum source 20, through a line 22 which enters the chamber 14 through an appropriate sealed aperture 24, and is connected to the ring 10 at a vacuum tee portion 26.

It will be apparent that, in practice, the chamber 14 is large enough to accommodate a large number of the laminated glass assemblies 12 and the vacuum rings 10, and includes appropriate support means, and an appropriate vacuum distribution network, not shown. It has been found desirable to employ a steam autoclave operated to produce a pressure of sixteen to seventeen atmospheres, while the pressure within the vacuum ring 10 is near zero atmospheres, for a pressure differential of seventeen to eighteen atmospheres.

It will be appreciated that the vacuum ring 10 includes a channel 28 which is substantially coextensive therewith and is adapted to receive the marginal edge portions of the associated laminated glass assembly 12 as clearly shown in FIGS. 2 and 3.

The laminated glass assembly 12 as illustrated in FIG. 2 is comprised of an outer glass sheet 30, a laminating plastic sheet 32, an inner glass sheet 34, an anti-laceration shield layer 36, and a cover glass sheet 38.

The laminating plastic sheet 32 bonds an inner side 40 of the outer glass sheet 30 to an outer side 42 of the inner glass sheet 34, while the anti-laceration shield layer 36 is bonded to an inner side 44 of the inner glass sheet 34. The shield layer 36 is not bonded to the cover glass sheet 38, since it has a surface 46 which is typically coated with a mold release compound of a waxy nature to prevent bonding.

The channel 28 is formed of a first wall portion 50, a second wall portion 52, and an interconnecting floor portion 54. The wall portions 50 and 52 include longitudinally extending continuous single grooves 56 and 58, respectively, each of which is approximately centered on the wall portions 50 and 52 respectively, and are thus distal from both the respective outer edges 60 and 62 of the wall portions 50 and 52, and from the respective intersections 64 and 66 of the wall portions 50 with 52 and the floor portion 54. The grooves 56 and 58 provide a continuous vacuum evacuation of the periphery of the laminated assembly 12 in the event the softened plastic layers should flow outward of the laminated assembly 12 and into the floor portion 54 restricting vacuum in that area.

The vacuum ring 10 also includes a longitudinally extending cavity 68 beneath a membrane 70. The membrane 70, typically between 0.025"–0.030" in thickness for silicone rubber, separates the floor portion 54 from the cavity 68. It has been found that a membrane thickness of approximately 0.0254" operates satisfactorily to achieve the objectives of the invention. The cavity 68 is provided with communication to the atmosphere by means of a plurality of spaced apart conduits 72 extending through the vacuum ring 10 and providing communication with the interior of the autoclave. The pressure exerted by the autoclave is applied to the membrane 70 through the conduits 72 to the marginal edges of the laminated glass assembly 12. Thus, the membrane 70 is forced to conform to the various glass sizes and alignments which may occur during production of the laminated glass assembly 12.

As illustrated in FIG. 3, the grooves 56 and 58 communicate with the vacuum source 20 through an interconnecting chamber 74 and an associated cylindrical passage 76. The communication of the grooves 56 and 58 with the vacuum source 20 provides continued vacuum supply for lamination when the membrane 70 is forced against the marginal edges of the glass assembly 12.

The cavity 68 is adapted to extend around the entire periphery of the vacuum ring 10 except for the vacuum tee portion 26 as illustrated in FIG. 4. The cavity 68 terminates prior to intersecting the vacuum tee portion 26 of the ring 10 at points 78 and 80, thereby preventing the loss of vacuum from the interconnecting chamber 74 and cylindrical passage 76 into the cavity 68.

The present invention provides a vacuum ring for evacuating the air from between laminae of a laminated assembly, which improves sealing to the laminae, whether of glass or other materials of varying thicknesses, sizes, and number of layers.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. Apparatus for removing air from between the facing surfaces of at least two laminae of a laminated assembly within an enclosed autoclave, the interior of which is adapted to be pressurized, comprising a ring formed of flexible material for surrounding the periphery of said laminated assembly, said ring including first and second facing wall portions interconnected by a floor portion, said facing wall portions and floor portion defining a channel having a cross sectional configuration conforming with the marginal edge portion of said laminated assembly for receiving said marginal edge portion therein, said floor portion comprising a membrane having opposite first and second surfaces, said first surface defining the floor of said channel, means defining an elongated cavity behind said membrane opposite said channel, said second surface defining a wall of said cavity, means selectively providing communication between said channel and a source of vacuum, and means providing communication between said cavity and said pressurized interior of said autoclave whereby said membrane is urged into intimate contact with the adjacent edge of said laminated assembly.

2. An apparatus as defined in claim 1, wherein said ring is formed of silicone rubber.

3. An apparatus as defined in claim 1, wherein said membrane is between 0.025" and 0.030" in thickness.

4. An apparatus as defined in claim 1, wherein said means providing communication between the channel and a source of vacuum comprise longitudinally extending groove means is formed in said first and second wall portions.

5. Apparatus as claimed in claim 1, wherein said means providing communication between said cavity and said pressurized interior comprises means defining a conduit extending through said ring from said cavity to said pressurized interior.

6. Apparatus as claimed in claim 5, wherein said elongated cavity extends substantially around said ring.

7. Apparatus as claimed in claim 6, including a plurality of said conduits located at spaced intervals along said cavity.

* * * * *